United States Patent [19]
Hafner et al.

[11] Patent Number: 5,447,809
[45] Date of Patent: Sep. 5, 1995

[54] ALKALINE PRIMARY BATTERY CONTAINING COATED CURRENT COLLECTOR

[75] Inventors: Steven J. Hafner, Timonium, Md.; Gregory S. Kulibert, Oshkosh, Wis.

[73] Assignee: Rayovac Corporation, Madison, Wis.

[21] Appl. No.: 333,946

[22] Filed: Nov. 3, 1994

Related U.S. Application Data

[60] Continuation of Ser. No. 245,062, May 17, 1994, abandoned, which is a continuation of Ser. No. 124,652, Sep. 7, 1993, abandoned, which is a continuation of Ser. No. 317,746, Mar. 2, 1989, abandoned, which is a continuation-in-part of Ser. No. 894,513, Sep. 6, 1986, abandoned, which is a division of Ser. No. 833,561, Feb. 21, 1986, abandoned, which is a continuation of Ser. No. 642,794, Aug. 21, 1984, abandoned.

[51] Int. Cl.$^6$ .................. H01M 6/08; H01M 2/02
[52] U.S. Cl. .................. 429/165; 429/169; 429/174; 429/206
[58] Field of Search .................. 429/163–165, 429/168, 169, 167, 174, 206, 217

[56] References Cited

U.S. PATENT DOCUMENTS

| | | | |
|---|---|---|---|
| 3,066,179 | 11/1962 | Ruben | 429/164 |
| 3,156,749 | 11/1964 | Hosfield | 264/161 |
| 3,485,675 | 12/1969 | Ruben | 429/130 |
| 3,663,301 | 5/1972 | Ralston et al. | 429/165 X |
| 3,764,392 | 10/1973 | Kuwazaki et al. | 429/165 X |
| 3,770,505 | 10/1973 | Bergum et al. | 136/10 |
| 4,011,103 | 3/1977 | Kardesch | 429/66 |
| 4,060,670 | 11/1977 | Tamminen | 429/154 |
| 4,098,967 | 7/1978 | Biddick et al. | 429/210 |

FOREIGN PATENT DOCUMENTS

| | | |
|---|---|---|
| 42-25145 | 12/1967 | Japan . |
| 52-112731 | 9/1977 | Japan . |
| 4836183 | 3/1983 | Japan . |
| 59-138069 | 8/1984 | Japan . |
| 59-146164 | 8/1984 | Japan . |

*Primary Examiner*—Anthony Skapars
*Attorney, Agent, or Firm*—Thomas F. Woods

[57] ABSTRACT

The performance characteristics of alkaline batteries are improved by applying a thin, polymeric coating to the inner surface of a positive current collector. The polymeric coating comprises, in combination, a first film forming binder component and a second component comprising an electrically conductive filler such as carbon. The coating reduces the internal resistance of a battery, and may even be used on unplated steel.

57 Claims, 6 Drawing Sheets

FIG. 1

ALKALINE PRIMARY BATTERY CONTAINING COATED CURRENT COLLECTOR

This application is a continuation of Ser. No. 08/245,062 filed May 17, 1994, now abandoned, which is a continuation of Ser. No. 08/124,652 filed Sep. 7, 1993, now abandoned, which is a continuation of Ser. No. 07/317,746 filed Mar. 2, 1989, now abandoned, which is a continuation-in-part of Ser. No. 06/894,513, filed Sep. 6, 1986, now abandoned, which is a division of Ser. No. 06/833,561, filed Feb. 21, 1986, now abandoned, which is a continuation of Ser. No. 06/642,794, filed Aug. 21, 1984, now abandoned.

FIELD OF THE INVENTION

The invention relates to alkaline primary batteries and, in particular, to a coating for improving the performance characteristics thereof, by reducing the high resistance between the cathode and the current collector.

BACKGROUND OF THE INVENTION

Small primary electrochemical cells have been commercially available for more than a century. Originally, all small commercially available primary electrochemical cells and batteries were of the zinc carbon type. However, the need for a higher capacity primary battery system led to the development of alkaline batteries. These batteries typically use an alkaline electrolyte instead of ammonium chloride and zinc chloride dissolved in water. Within the last two decades alkaline electrochemical cells have become a tremendous commercial success. In fact, sales of alkaline batteries now exceed those of zinc carbon batteries in the United States.

The most commercially successful alkaline batteries have been cylindrical cells of the well known "AAA", "AA", "C" and "D" sizes. Generally, such alkaline cylindrical batteries comprise a cathode which is a mixture of manganese dioxide, $MnO_2$, and a carbonaceous material, typically graphite. In some cylindrical alkaline cells, this cathode mixture, which is often wetted with electrolyte is compressed into annular rings. The cathode is placed into a metallic container which also serves as the positive current collector. Anodes of alkaline electrochemical cells usually comprise powdered zinc in some type of gel, usually carboxymethylcellulose. This anodic material is often present as a hollow cylinder into which the electrolyte, usually an immobilized solution of potassium hydroxide, is placed. The anodic current collector, usually a brass pin, is placed in electrical contact with the anode. The anode and the cathode of such alkaline cells are usually separated by a separator comprised of non-woven, inert fabric.

As with other electrochemical cell systems, a decrease in the internal cell resistance of alkaline electrochemical cells increases cell performance. It is generally agreed that much of the internal resistance in alkaline electrochemical cells results from poor electrical contact, i.e., contact resistance, between the cathode and the positive current collector and the electrical resistance of the positive current collector. Consequently, it is desirous to provide for an alkaline electrochemical cell which has a positive current collector with low electrical resistance and good electrical connection between the positive current collector and the cathode.

One method of obtaining the desired electrical contact between the positive current collector and the cathode mix is to create high pressure at the interface between the two members. Hosfield, in U.S. Pat. No. 3,156,749, obtains high pressure contact through forming a cylindrical battery cathode by impact molding it within the current collector. High pressure contact can also be achieved by inserting annular rings of cathode mix into the positive current collector, which has an inside diameter less than the outside diameter of the cathode rings.

Even with good electrical connection realized through high pressure contact, it has been long recognized that contact resistance between the cathode and an untreated steel current collector causes a reduction in the performance of alkaline dry cell batteries. This resistance, which is known to increase during storage especially at high temperatures, is believed to be a function of the amount of oxide formed at the cathode-current collector interface. It is believed that the alkaline electrolyte reacts with the surface of the current collector to form a solid oxide.

A number of solutions to this increased resistance, i.e. oxide formation, have been suggested. For example, Ruben, in U.S. Pat. No. 3,066,179, taught that by applying a thin coat of gold to a steel current collector, the resistance between the cathode mix and the current collector would be markedly decreased since oxide formation would be minimized. In U.S. Pat. No. 3,485,675, Ruben suggested a surface carburized layer on the steel. Again, the solution taught by Ruben decreased the amount of oxide formed at the cathode-current collector interface. Moreover, both solutions taught by Ruben supplied the surface of the current collector with a continuous layer of a material which approximated the conductivity of bare metal. However, with the price of gold at least ten times greater today than when Ruben proposed its use as a coating for the current collector and the well-known expense and difficulty of obtaining a carburized surface layer on steel, other ways of reducing contact resistance in alkaline electrochemical cells are needed.

To avoid the expensive solutions for reducing the contact resistance between the cathode mix and the positive current collector proposed by Ruben, in Japanese Patent Publication No. 42-25145 Uchida et al. proposed coating the entire inner surface of the positive current collector with a graphite laden synthetic resin. However, since it is well known that placing any material which is less electrically conductive than steel between the cathode mix and the positive current collector increases the electrical resistance of the current collector (and graphite is at least one order of magnitude less conductive than steel and most synthetic resins are orders of magnitude less conductive than steel), the '145 reference proposes using substantial amounts of graphite in the resin. In a similar teaching, Shinoda et al. disclose in Japanese Patent Publication No. 48361-1983 a resinous coating having a high amount of carbonaceous material, wherein the coating contains between 50 and 70 weight percent carbon, and the coating is disposed over the entire inner surface of the positive current collector.

The amounts of carbon proposed for use in the synthetic resins by the Japanese references are so high that it is very unlikely that the resinous coatings disclosed therein would adhere to a positive current collector well enough for further processing. Moreover, even if the coatings did adhere to a metal current collector, they would probably lack sufficient mechanical integrity to remain attached thereto. For example, a small mechanical shock, such as placing a battery in a device, might cause the coating to become dislodged from the metal current collector. Moreover, both references disclose coatings disposed continuously over the entire inner surface of the positive current collector, thereby making the manufacture of cells according to those inventions a slow and expensive process. Consequently, the problems inherent with such large amounts of carbon in a dry coating, together with the requirement that the coating be continuous, cause the search for a more complete solution to the problem to continue.

While all of the aforementioned solutions have been attempted, the present commercial solution involves plating a steel current collector with nickel. While less expensive than plating a surface with gold or providing such a surface with a carburized layer, nickel plating has been found to be an expensive solution to the problem of decreasing contact resistance, without increasing internal cell resistance. Nickel plating of steel has been thought to be of such importance that some battery manufacturers have used resinous coatings such as were disclosed in the aforementioned Japanese references on nickel plated steel current collectors. (It is interesting to note that the aforementioned Japanese references do not propose using the various resins on unplated steel current collectors.) Consequently, the ability to use a steel current collector without providing for an expensive to apply continuous surface layer has long been sought by the manufacturers of alkaline electrochemical cells.

It is an object of the present invention to provide for an alkaline electrochemical cell having low internal resistance.

It is another object of the present invention to provide for a reduction in the contact resistance between the cathode mix and the positive current collector of alkaline cells, thereby increasing the performance of such cells.

It is yet another object of the present invention to provide for an alkaline electrochemical cell which avoids the use of nickel plated steel.

Still another object of the present invention is to increase the shelf life of alkaline primary cells.

Yet another object of the present invention is to provide for the reduction in the cost of manufacturing alkaline primary batteries having superior performance characteristics.

These and additional objects become more fully apparent with the following description.

SUMMARY OF THE INVENTION

An alkaline electrochemical cell having a positive current collector consisting of an unplated steel can coated with a thin conductive polymeric coating exhibits reduced internal resistance. A polymeric resin, which upon drying becomes a thin conductive coating, apparently prevents the formation of a high resistance layer between the cathode and the positive current collector, even during storage at elevated temperatures.

DETAILED DESCRIPTION OF THE INVENTION

The objects of the present invention are achieved by forming a thin conductive polymeric coating on the surface of the positive current collector of alkaline primary cells. The thin conductive polymeric coating surprisingly reduces the internal resistance of alkaline batteries even though it increases the contact resistance between the inner surface of the positive current collector and the outer peripheral sidewalls of the cathode. The improved performance characteristics of alkaline primary cells incorporating this invention vis-a-vis cells of the prior art becomes more apparent when cells are stored for long periods of time; the present invention prevents the significant drop-off in performance noted in alkaline cells stored for long periods of time at high temperatures. The present invention, since it eliminates the need for nickel-plated steel and does not require a continuous, uniform application of the conductive coating, reduces the costs of manufacturing alkaline primary cells.

In accordance with the present invention, the interior surfaces of the current collector of an alkaline dry cell are coated with a conductive organic resin. This resin, which may be applied by various techniques, including painting, spraying or dipping, contains an alkaline resistant organic binder dissolved in a compatible solvent. Spraying is the preferred method of applying the conductive primer.

After being applied to the positive current collector, the conductive organic resin is dried at elevated temperatures, which permits the evaporation of the solvent and allows for the adhesion to the positive current collector of a thin, electrically conductive polymeric coating. The resulting conductive polymeric coating is typically 0.0006 inches to 0.0008 inches thick, but may range from 0.0001 inches to 0.002 inches in thickness. The conductive coating need not be uniform in thickness nor continuous upon the surface of the positive current collector. The conductive coating, therefore, may have discontinuities therein. Improvements in the performance of alkaline primary cells incorporating the present invention versus such cells incorporating unplated steel positive current collectors have been found when only 25% of the surface of the positive current collector was covered by the conductive coating. Surprisingly, however, alkaline dry cell batteries in which the entire surface of the positive current collector was covered with the thin conductive polymeric coating performed no better than alkaline dry cells batteries in which the conductive polymeric coating covered only 50% of the surface of the positive current collector. Therefore, while the conductive polymeric coating should be resistant to the alkaline electrolyte, it need not be impervious to the electrolyte since the present invention includes the use of a discontinuous conductive film on the positive current collector.

In the present invention, the organic binder must be a film forming polymer which is compatible with alkaline battery components. Film forming organic binders which hydrolyze or oxidize in the presence of the electrolyte or which react with the cathode materials of such cells cannot be used in practicing the present invention. The present invention can be successfully practiced with a wide range of organic binders including ABS (acrylonitrile butadiene styrene), PVC (polyvinyl chloride), epoxies, fluorocarbons, nylons, polypropylene, polybutylene, polystyrenes and neoprenes. The present invention may also be practiced with binders which are rubbers or elastomers, such as isobutylene, isoprene, chloroprene, polysulfide, ethylene propylene, chlorinated and chlorosulfonated polyethylene, fluorosilicone and propylene oxide. However, materials which are soluble in KOH, the usual electrolyte in alkaline dry cells, such as CMC (which is disclosed in the Japanese Patent 42-25145), should not be used in practicing the present invention.

The solvent portion of the resin must wet the surface of the positive current collector. The solvent must also be fully compatible with the binder. The present invention can be successfully practiced with solvents such as ethyl acetate, butanol, methyl ethyl ketone, methyl isobutyl ketone, and paraffinic hydrocarbon liquids.

To obtain the necessary conductivity, a conductive organic binder may be used. Alternatively, a conductive material such as conductive carbon or metal powder may be compounded in the primer such that the conductive material is dispersed throughout the polymeric coating upon evaporation of the solvent. One method of obtaining the desired conductivity is to mill into the binder a carbonaceous material, usually carbon black, acetylene black or graphite, at a temperature at which the binder will flow, thereby dispersing carbon throughout the binder. The carbon loaded binder can then be diluted with the appropriate solvent and applied to the current collector as disclosed herein.

In practicing the present invention, it has been found that the resulting conductive polymeric coating must be at least as conductive as well known anti-stats. It has also been found that the resultant film should have sufficient mechanical integrity and abrasion resistance to remain adhered to the positive current collector during the force fitting of the cathode mix into the current collector, a procedure widely used commercially.

When carbon is added to the binder to form the conductive primer, the weight percent of the carbon in the conductive polymeric coating adhering to the positive current collector after evaporation of the solvent, should range between twenty-five (25) percent and forty (40) percent. While increasing the amount of carbon in the conductive polymeric coating above forty percent might reduce the cell resistivity, the resulting reduction in the binder to carbon ratio decreases the mechanical integrity of the conductive film and increases the probability that the conductive film will not adhere sufficiently to the surface of the positive current collector. Similarly, as the carbon weight percent is decreased below twenty (20) percent, the conductivity of the film decreases, which causes the electrical resistance of the current collector to increase to a point that the advantages taught by the present invention become negligible.

DESCRIPTION OF THE PREFERRED EMBODIMENTS

Figure 1:
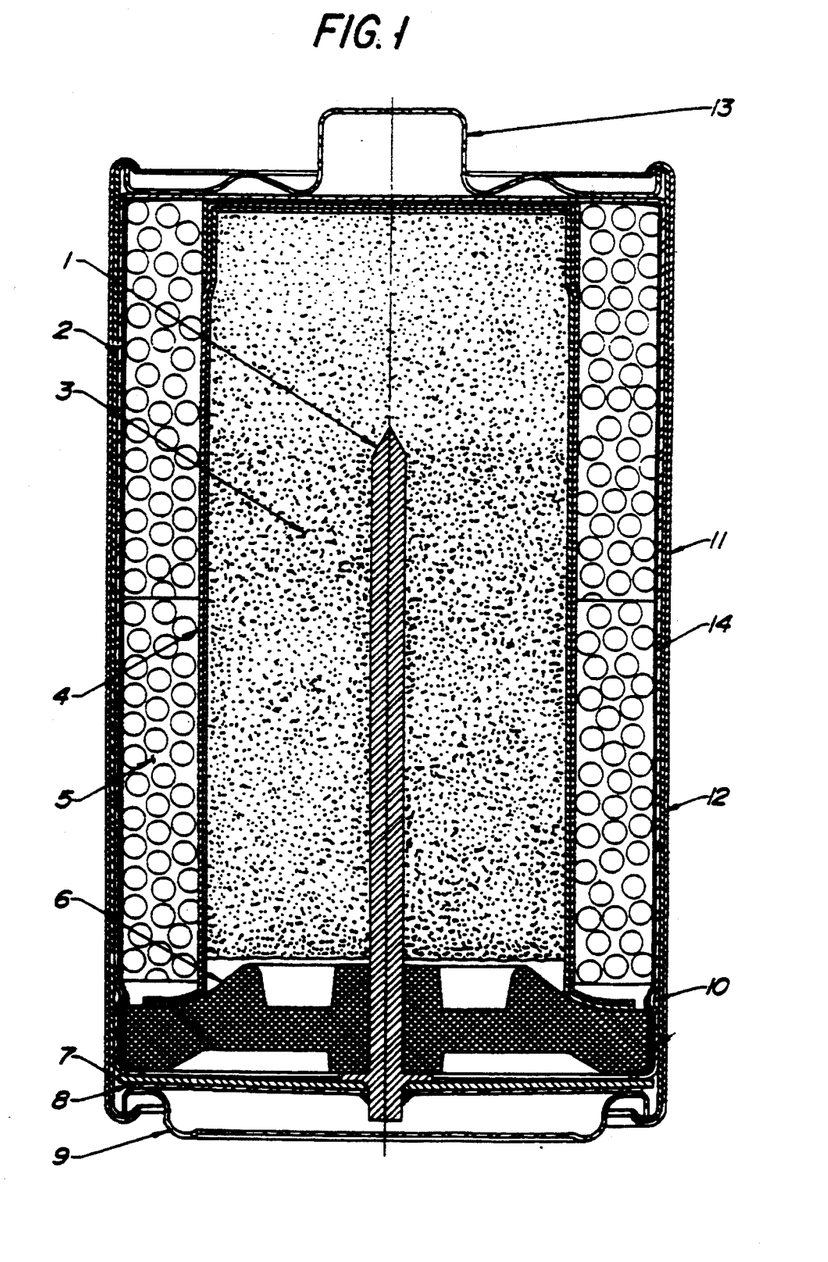
FIG. 1 is a drawing of an alkaline cylindrical battery incorporating this invention.

FIG. 1 is a cross-sectional diagram of an alkaline cylindrical battery using this invention. The positive current collector, a drawn steel container 2, open on one end and about 0.010 inches thick, has a coating 14 applied to its interior surfaces. Two cathode annular rings 5, formed such that their outside diameters are greater than the inside diameter of the positive current collector, are forced into the positive current collector, forming a pressure contact with the coating. A bead 10 is rolled into the container near the open end to support the sealing disk. A separator 4 and an anode 3 are placed inside of the cathode rings. A sealing disk 6 containing a negative current collector 1 is placed into the open end of the container and in contact with the bead. The open end of the container is crimped over the sealing disk thus compressing it between the crimp and the bead to seal the cell. An insulation washer 7 with a central aperture is placed over the crimped end of the cell such that the end of the negative current collector 1 protrudes through the aperture. A contact spring 8 is affixed to the end of the negative current collector 1. Terminal caps 9 and 13 are placed into contact with the contact spring 8 and the positive current collector 2, respectively, and an insulating tube 12 and steel shell 11 are placed around the cell and crimped on their ends to hold the terminal caps in place.

Several examples of the utility of the present invention will now be explained.

EXAMPLE 1

Five grams of XC-72 carbon black (Cabot Corporation) and 500 grams of Adcoat 52G1B (Morton Chemical Co.), which is approximately 2% solids, were added to a jar which was one-half full of one-eighth inch steel shot. The jar was capped and placed on a ball mill for 45 minutes. The contents of the jar were then sprayed onto the interior surface of unplated steel, D-size alkaline manganese positive current collectors and dried at 180° F. for five minutes, which yielded a carbon concentration in the dried film of approximately 33.3%.

The cathode mix (manganese dioxide, graphite, potassium hydroxide, water, acetylene black and cement) was formed into cylinders and placed in the coated positive current collector. A separator material was placed against the inner surface of the cathode cylinders. The separator was then filled with gelled potassium hydroxide and amalgamated zinc. After a plastic seal and a negative current collector were inserted into the positive can, the battery was sealed.

Figure 2:
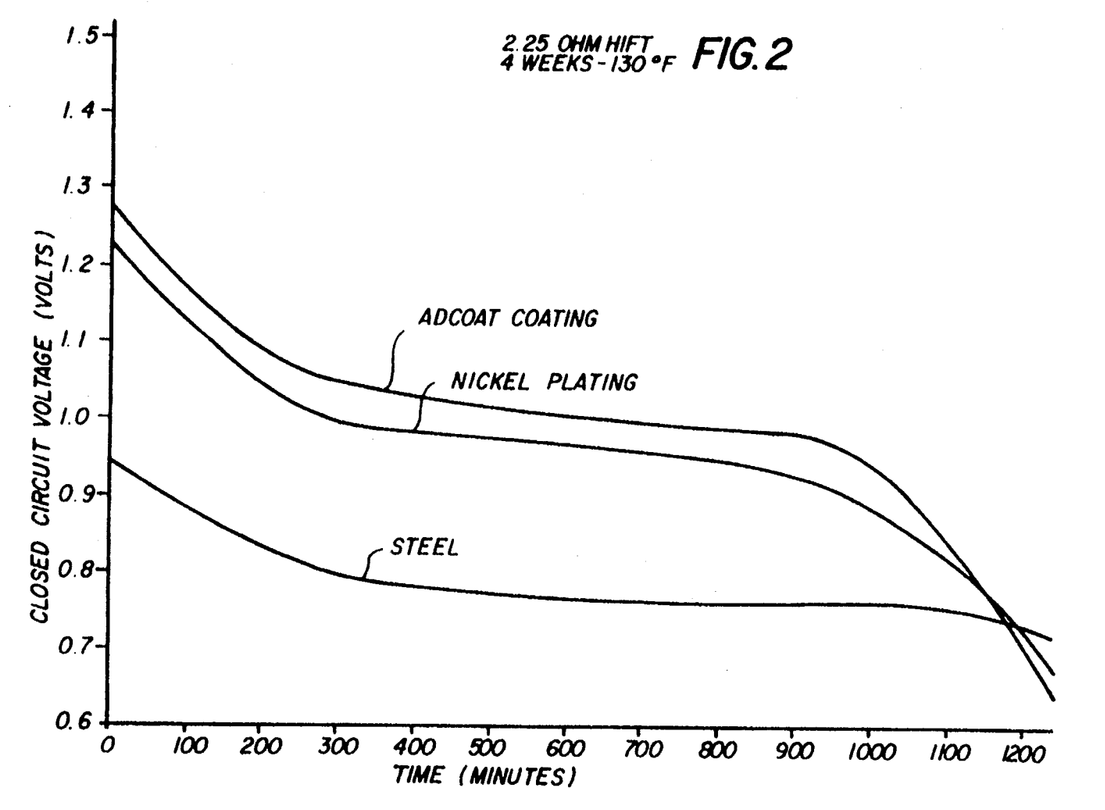
FIG. 2 is a graph of battery voltage versus discharge time for batteries incorporating this invention, batteries of the commercial prior art, and batteries neither of the prior art nor incorporating this invention.

These batteries were discharged on the ASTM heavy industrial flashlight test (2.25 HIFT), which is 2.25 ohms four minutes out of fifteen minutes, eight hours/day, seven days/week. FIG. 2 is a graph of the 2.25 HIFT discharge voltage after storage at 130° F. for four weeks. The batteries constructed with the conductive polymeric coating covering the positive current collectors had a higher closed circuit voltage than batteries using nickel plated steel or unplated steel positive current collectors.

EXAMPLE 2

Many commercially available conductive coatings are available which are applicable to this invention. Several examples of these conductive coatings are listed in Table 1, which describes the composition and the transverse resistance for these commercial coatings. For comparison purposes, Table 1 includes an uncoated nickel plated steel can, which has a transverse resistance of 0.00 ohms.

Figure 3:
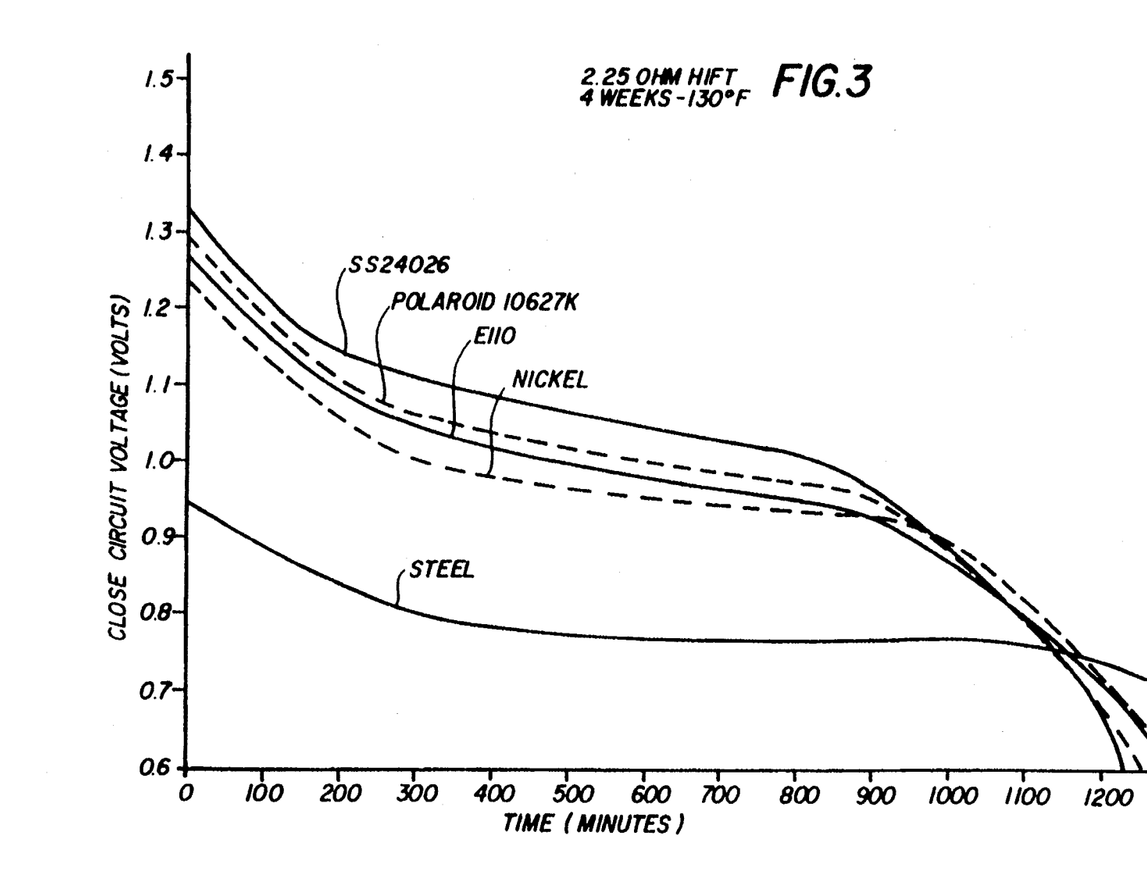
FIG. 3 is a graph of battery voltage versus discharge time for several alternative embodiments of this invention.

Batteries constructed with positive current collectors coated with some of the above listed coatings perform similarly to batteries constructed with the coating in Example 1. FIG. 3, a graph of closed circuit voltage versus discharge time, after storage for 4 weeks at 130° F., on the 2.25 HIFT test, compares the performance of batteries constructed with positive current collectors coated with commercially available conductive coatings with batteries constructed as in Example 1.

current collector in order to practice the present invention. Batteries made from unplated steel positive current collectors wherein the conductive film coated only 50% of the current collector performed essentially the same as those batteries wherein the positive current collector was 100% covered. Batteries wherein the conductive film covered only 25% of the positive current collector performed as well as batteries constructed with uncoated, nickel-plated steel positive current collectors.

It is well known in the battery arts that the internal resistance of a cell is the sum of the ionic and electronic resistances of the cell. In accordance with the well known equation $V/R=I$ (Ohm's Law), it is also well known that the lower the internal resistance of a battery, the more current the battery is capable of delivering. Furthermore, and also in accordance with Ohm's Law, the higher the internal resistance of a cell, the greater the voltage drop across its internal resistance, and the lower the terminal voltage of the cell.

Figure 4:
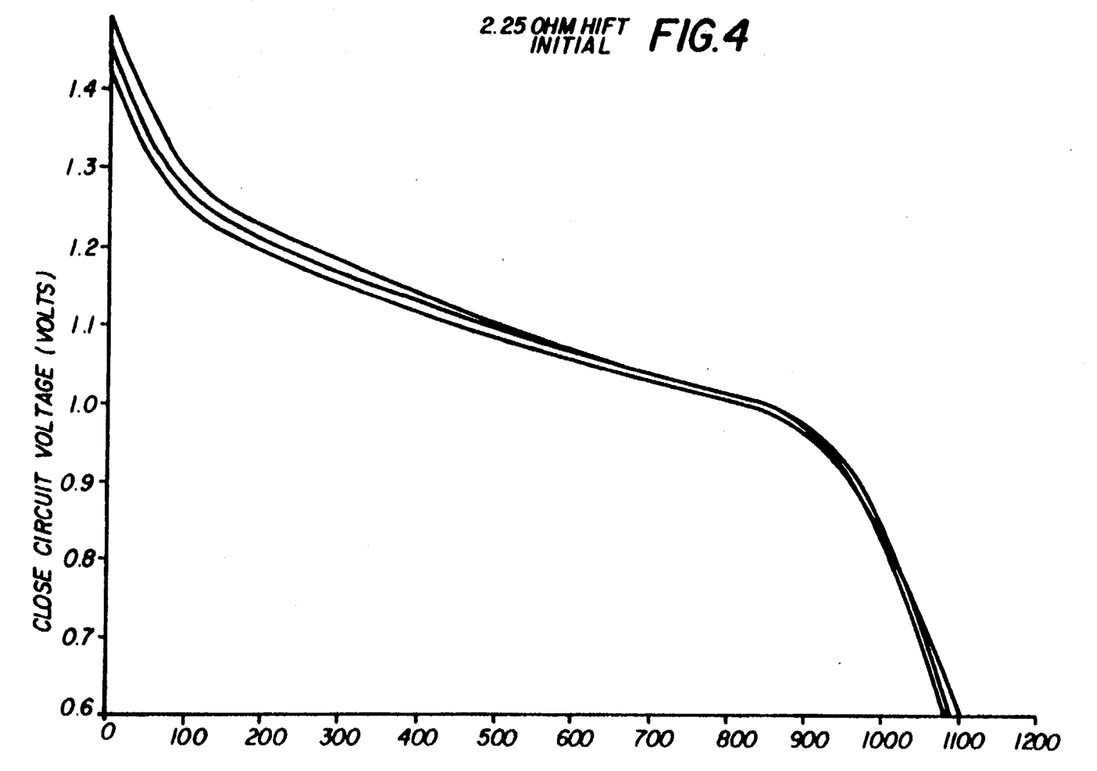
FIG. 4 is a graph of fresh battery voltage versus discharge time for batteries incorporating this invention, batteries of the commercial prior art, and batteries neither of the prior art nor incorporating this invention.
Figure 5:
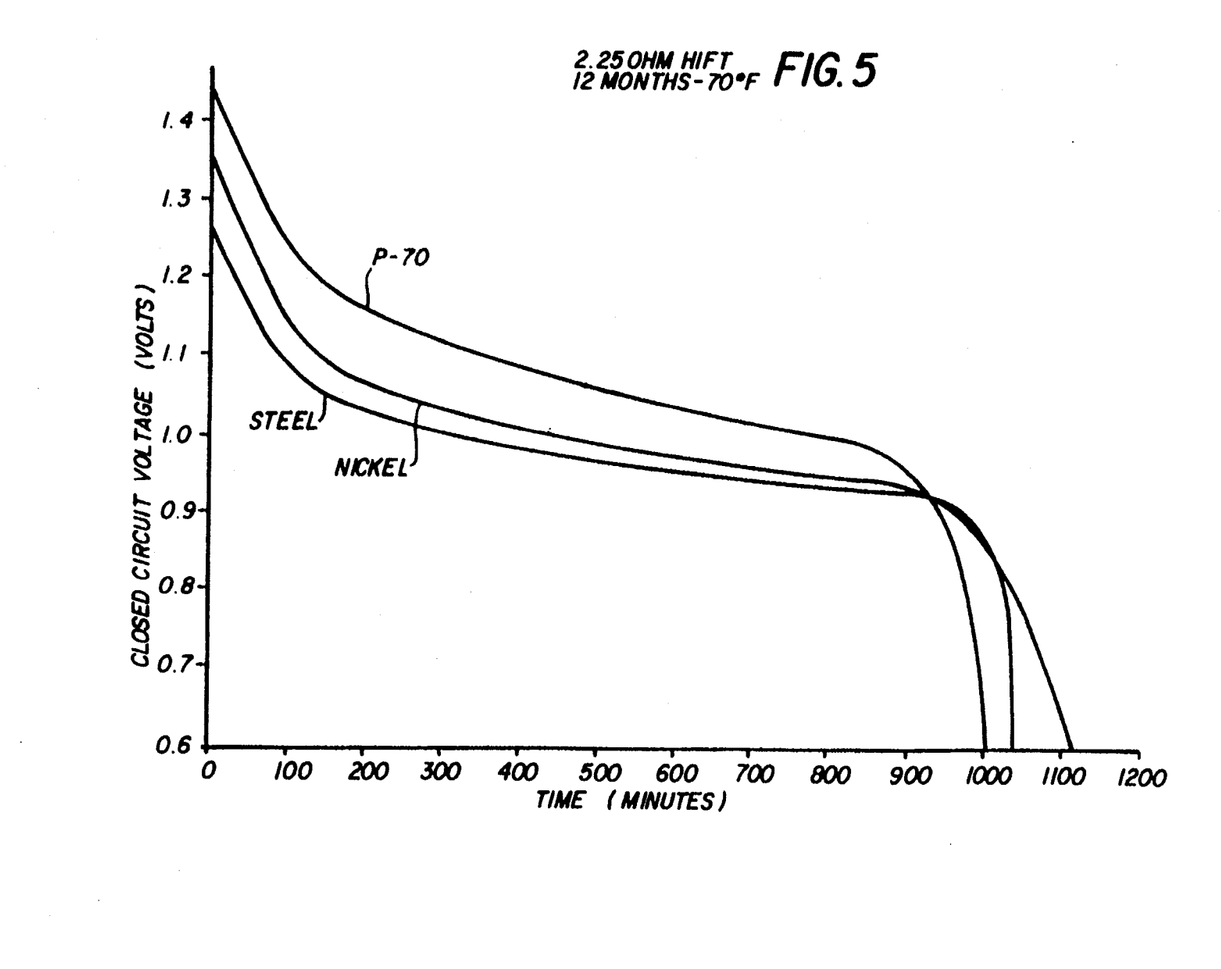
FIG. 5 is a graph of battery voltage versus discharge time after storage for twelve months, for batteries incorporating this invention, batteries of the commercial prior art, and batteries neither of the prior art nor incorporating this invention.
Figure 6:
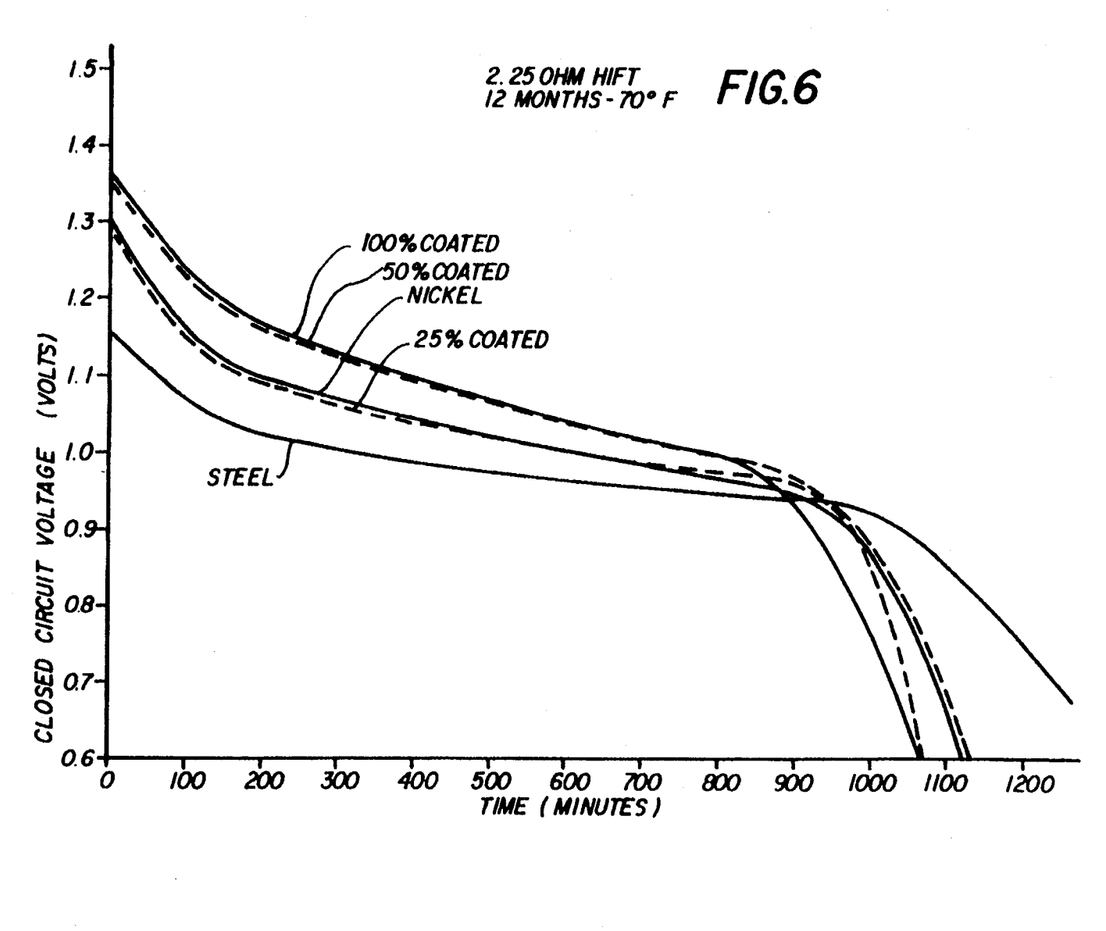
FIG. 6 is a graph of battery voltage versus discharge time after storage for twelve months for batteries incorporating the present invention, wherein the conductive film only partially covers the positive current collector, batteries of the commercial prior art, and batteries neither of the prior art nor incorporating this invention.

FIGS. 4, 5, and 6 illustrate test results wherein all

TABLE 1

Commercial Conductive Polymer Compositions

| Conductive Polymer | Conductive Acient | Polymer nu | Manufacturer | Transverse Electrical Resistance on "D" Size Steel Cans (Ohms/1.275 in$^2$) |
| --- | --- | --- | --- | --- |
| 10627-K | Carbon Black | PVC | Polaroid | .037 |
| SS24055 | Graphite | epoxy | Acheson Colloids | .271 |
| SS24056 | Graphite | epoxy | Acheson Colloids | .094 |
| SS24026 | Graphite | epoxy | Acheson Colloids | .177 |
| SS24018 | Graphite | vinyl | Acheson Colloids | .116 |
| Electrodag 110 | Graphite | PVC | Acheson Colloids | - |
| Electrodag 199 | Carbon Black | Neoprene | Acheson Colloids | - |
| Electrodag 502 | Graphite/ Carbon Black | Fluoro- elastomer | Acheson Colloids | .022 |
| LS1181 | Graphite | — | Graphite Products | .454 |
| P70 | Carbon Black | PVC | Pervel Industries | .014 |
| 155-293 | — | epoxy | G. Bartels | .006 |
| None | None | None | Nickel plated steel can | .000 |
| SS24018 | Graphite | Vinyl | Acheson Colloids | 0.022 |

EXAMPLE 3

To demonstrate the advantage of the present invention in batteries which are stored for extended periods of time, steel cans were spray coated with P-70 primer and assembled into batteries as in Example 1. When these batteries were placed on the 2.25 HIFT, initially only a small improvement was seen in the closed circuit voltage during discharge (FIG. 4). However, when these batteries were aged at room temperature for one year, the same increase in the discharge closed circuit voltage was seen as for batteries aged for 4 weeks at 130° F. (FIG. 5), demonstrating that when batteries are constructed in accordance with the present invention, the shelf life of such alkaline batteries will be markedly increased.

EXAMPLE 4

To determine whether a continuous conductive coating of the positive current collector was required, the interior surfaces of unplated steel positive current collectors were coated with varying amounts of P-70 primer. These positive current collectors were then assembled into batteries as in Example 1. The batteries were stored for one year at 70° F. and then discharged on the 2.25 HIFT test. The results, shown in FIG. 6, evidence that it is not necessary to form a continuous, electrolyte resistant, conductive coating of the positive tested batteries were discharged across a constant 2.25 ohm load. Except for the conductive coating disposed on the inner surface of some cells, all tested cells were of the same construction. Thus, there was only one variable in those tests: the unplated steel containers of the tested batteries either did, or did not, have polymeric conductive coatings disposed on the inner surfaces thereof.

FIGS. 4, 5, and 6 show that cells made according to the present invention exhibit higher closed circuit voltages during discharge than do cells not having the coating disclosed herein but discharged under identical conditions. In accordance with the foregoing well known electrical principles, then, the increased performance of the cells of the present invention is directly attributable to those cells having lower internal resistances.

FIGS. 4, 5, and 6 also show that the internal resistances of cells having the coatings disclosed herein are lower in respect of cells not having the coating, even when the coating covers less than all of the internal surface of the container, and even though the coating actually increases the transverse resistance across the combined thicknesses of the coating 14 and the container 2.

From the results in the foregoing examples and the referenced drawings, it is evident that the alkaline cells of this invention are superior to conventional alkaline batteries. Although certain preferred embodiments of the present invention have been described, the spirit and scope of the invention are by no means restricted to what is described above.

What is claimed is:

1. An alkaline electrochemical cell, comprising:
   (a) an unplated cylindrical steel container having an inner surface, a closed first end forming a bottom, an initially open second end, and upstanding sidewalls, the container forming a positive current collector;
   (b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;
   (c) a cylindrical anode having an outer peripheral surface and comprising gelled zinc, the anode being disposed within the central cylindrically shaped void;
   (d) an ionically permeable separator interposed between at least a portion of the outer peripheral surface of the anode and the inner peripheral sidewalls of the cathode;
   (e) an alkaline aqueous electrolyte comprising potassium hydroxide, the electrolyte at least partially wetting the anode, the cathode, and the separator;
   (f) a negative current collector electrically connected to the anode;
   (g) a sealing disk disposed over the top of the initially open second end, the disk sealing inside the container the components disposed therewithin; the negative current collector extending through the sealing disk, and
   (h) a conductive polymeric coating comprising a first film forming binder component and a second component comprising electrically conductive carbon, the coating having a thickness of no more than 0.002 inches, the film forming component of the coating being resistant to chemical reaction with the alkaline electrolyte, the coating being interposed between, and being in electrical contact with, both the outer peripheral sidewalls of the cathode and the inner surface of the container, the coating further having discontinuities therein and covering less than 100 percent of the inner surface of the container, the electrolyte being in direct contact with at least a portion of the unplated steel of the inner surface of the container;

wherein the cell has a lower internal resistance in respect of another cell having otherwise identical construction but having no conductive polymeric coating disposed on the inner surface of its container.

2. An alkaline electrochemical cell as in claim 1, wherein the polymeric coating has a thickness between 0.0001 and no more than 0.002 inches.

3. An alkaline electrochemical cell as in claim 1, wherein the polymeric coating has a thickness between 0.0006 and 0.0008 inches.

4. An alkaline electrochemical cell as in claim 1, wherein the polymeric coating comprises between 25 percent by weight and less than 40 percent by weight electrically conductive carbon.

5. An alkaline electrochemical cell as in claim 1, wherein the polymeric coating comprises between 25 percent by weight and less than 40 percent by weight electrically conductive carbon.

6. An alkaline electrochemical cell as in claim 1, wherein the polymeric coating comprises between 33.3 percent by weight and less than 40 percent by weight electrically conductive carbon.

7. An alkaline electrochemical cell as in claim 1, wherein the polymeric coating comprises between 20 percent by weight and 33.3 percent by weight electrically conductive carbon.

8. An alkaline electrochemical cell as in claim 1, wherein the polymeric coating comprises between 25 percent by weight and 33.3 percent by weight electrically conductive carbon.

9. An alkaline electrochemical cell as in claim 1, wherein the polymeric coating comprises between 20 percent by weight and 25 percent by weight electrically conductive carbon.

10. An alkaline electrochemical cell as in claim 1, wherein the polymeric coating further covers at least 25 percent of the inner surface of the container.

11. An alkaline electrochemical cell as in claim 1, wherein the polymeric coating further covers at least 50 percent of the inner surface of the container.

12. An alkaline electrochemical cell as in claim 1, wherein the polymeric coating further covers less than 50 percent of the inner surface of the container.

13. An alkaline electrochemical cell as in claim 1, wherein the polymeric coating further covers at least 75 percent of the inner surface of the container.

14. An alkaline electrochemical cell as in claim 1, wherein the polymeric coating further covers less than 75 percent of the inner surface of the container.

15. An alkaline electrochemical cell as in claim 1, wherein the polymeric coating further covers between 25 percent and 75 percent of the inner surface of the container.

16. An alkaline electrochemical cell as in claim 1, wherein the polymeric coating further covers between 25 percent and 50 percent of the inner surface of the container.

17. An alkaline electrochemical cell as in claim 1, wherein the polymeric coating further covers between 50 percent and 75 percent of the inner surface of the container.

18. An alkaline electrochemical cell as in claim 1, wherein the polymeric coating is not hydrolyzed or oxidized by the alkaline electrolyte.

19. An alkaline electrochemical cell as in claim 1, wherein the first film forming binder component comprises at least one of ABS (acrylonitrile butadiene styrene), PVC (polyvinyl chloride), epoxy, fluorocarbon, nylon, polypropylene, polybutylene, polystyrene, neoprene, isobutylene, isoprene, chloroprene, polysulfide, ethylene propylene, chlorinated polyethylene, chlorosulfonated polyethylene, fluorosilicone, and propylene oxide.

20. An alkaline electrochemical cell as in claim 1, wherein the first film forming binder component includes a film forming organic binder.

21. An alkaline electrochemical cell as in claim 1, wherein the first film forming binder component includes rubber.

22. An alkaline electrochemical cell as in claim 1, wherein the first film forming binder component includes an elastomer.

23. An alkaline electrochemical cell as in claim 1, wherein the container and the coating have a combined transverse electrical resistance of at least 0.006 ohms when measured over an area of 1.275 square inches.

24. An alkaline electrochemical cell as in claim 1, wherein the container and the coating have a combined transverse electrical resistance of up to 0.454 ohms when measured over an area of 1.275 square inches.

25. An alkaline electrochemical cell as in claim 1, wherein the container and the coating have a combined transverse electrical resistance of between 0.006 ohms and 0.454 ohms when measured over an area of 1.275 square inches.

26. An alkaline electrochemical cell as in claim 1, wherein the polymeric coating does not provide the container with structural integrity.

27. An alkaline electrochemical cell as in claim 1, wherein the outer peripheral sidewalls of the cathode frictionally engage the coating.

28. An alkaline electrochemical cell, comprising:
(a) an unplated cylindrical steel container having an inner surface, a closed first end forming a bottom, an initially open second end, and upstanding sidewalls, the container forming a positive current collector;
(b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;
(c) a cylindrical anode having an outer peripheral surface and comprising gelled zinc, the anode being disposed within the central cylindrically shaped void;
(d) an ionically permeable separator interposed between at least a portion of the outer peripheral surface of the anode and the inner peripheral sidewalls of the cathode;
(e) an alkaline aqueous electrolyte comprising potassium hydroxide, the electrolyte at least partially wetting the anode, the cathode, and the separator;
(f) a negative current collector electrically connected to the anode;
(g) a sealing disk disposed over the top of the initially open second end, the disk sealing inside the container the components disposed therewithin; the negative current collector extending through the sealing disk, and
(h) a conductive polymeric coating comprising a first film forming binder component and a second component comprising an electrically conductive filler, the coating having a thickness of no more than 0.002 inches, the film forming component of the coating being resistant to chemical reaction with the alkaline electrolyte, the coating being interposed between, and being in electrical contact with, the outer peripheral sidewalls of the cathode and the inner surface of the container, the coating further having discontinuities therein and covering less than 100 percent of the inner surface of the container, the electrolyte being in direct contact with at least a portion of the unplated steel of the inner surface of the container;
wherein the cell has a lower internal resistance in respect of another cell having otherwise identical construction but having no conductive polymeric coating disposed on the inner surface of its container.

29. An alkaline electrochemical cell as in claim 28, wherein the conductive filler comprises electrically conductive carbon.

30. An alkaline electrochemical cell as in claim 28, wherein the electrically conductive filler comprises electrically conductive metal powder.

31. An alkaline electrochemical cell as in claim 28, wherein the electrically conductive filler comprises one of carbon black, acetylene black, and graphite.

32. An alkaline electrochemical cell as in claim 28, wherein the polymeric coating has a thickness between 0.0001 and 0.002 inches.

33. An alkaline electrochemical cell as in claim 28, wherein the polymeric coating has a thickness between 0.0006 and 0.0008 inches.

34. An alkaline electrochemical cell as in claim 28, wherein the polymeric coating comprises between 20 percent by weight and less than 40 percent by weight electrically conductive filler.

35. An alkaline electrochemical cell as in claim 28, wherein the polymeric coating comprises between 25 percent by weight and less than 40 percent by weight electrically conductive filler.

36. An alkaline electrochemical cell as in claim 28, wherein the polymeric coating comprises between 33.3 percent by weight and less than 40 percent by weight electrically conductive filler.

37. An alkaline electrochemical cell as in claim 28, wherein the polymeric coating comprises between 20 percent by weight and 33.3 percent by weight electrically conductive filler.

38. An alkaline electrochemical cell as in claim 28, wherein the polymeric coating comprises between 25 percent by weight and 33.3 percent by weight electrically conductive filler.

39. An alkaline electrochemical cell as in claim 28, wherein the polymeric coating comprises between 20 percent by weight and 25 percent by weight electrically conductive filler.

40. An alkaline electrochemical cell as in claim 28, wherein the polymeric coating further covers at least 25 percent of the inner surface of the container.

41. An alkaline electrochemical cell as in claim 28, wherein the polymeric coating further covers at least 50 percent of the inner surface of the container.

42. An alkaline electrochemical cell as in claim 28, wherein the polymeric coating further covers less than 50 percent of the inner surface of the container.

43. An alkaline electrochemical cell as in claim 28, wherein the polymeric coating further covers at least 75 percent of the inner surface of the container.

44. An alkaline electrochemical cell as in claim 28, wherein the polymeric coating further covers less than 75 percent of the inner surface of the container.

45. An alkaline electrochemical cell as in claim 28, wherein the polymeric coating further covers between 25 percent and 75 percent of the inner surface of the container.

46. An alkaline electrochemical cell as in claim 28, wherein the polymeric coating further covers between 25 percent and 50 percent of the inner surface of the container.

47. An alkaline electrochemical cell as in claim 28, wherein the polymeric coating further covers between 50 percent and 75 percent of the inner surface of the container.

48. An alkaline electrochemical cell as in claim 28, wherein the polymeric coating is not hydrolyzed or oxidized by the alkaline electrolyte.

49. An alkaline electrochemical cell as in claim 28, wherein the first film forming binder component comprises at least one of ABS (acrylonitrile butadiene styrene), PVC (polyvinyl chloride), epoxy, fluorocarbon, nylon, polypropylene, polybutylene, polystyrene, neoprene, isobutylene, isoprene, chloroprene, polysulfide, ethylene propylene, chlorinated polyethylene, chlorosulfonated polyethylene, fluorosilicone, and propylene oxide.

50. An alkaline electrochemical cell as in claim 28, wherein the first film forming binder component includes a film forming organic binder.

51. An alkaline electrochemical cell as in claim 28, wherein the first film forming binder component includes rubber.

52. An alkaline electrochemical cell as in claim 28, wherein the first film forming binder component includes an elastomer.

53. An alkaline electrochemical cell as in claim 28, wherein the container and the coating have a combined transverse electrical resistance of at least 0.006 ohms when measured over an area of 1.275 square inches.

54. An alkaline electrochemical cell as in claim 28, wherein the container and the coating have a combined transverse electrical resistance of up to 0.454 ohms when measured over an area of 1.275 square inches.

55. An alkaline electrochemical cell as in claim 28, wherein the container and the coating have a combined transverse electrical resistance of between 0.006 ohms and 0.454 ohms when measured over an area of 1.275 square inches.

56. An alkaline electrochemical cell as in claim 28, wherein the polymeric coating does not provide the container with structural integrity.

57. An alkaline electrochemical cell as in claim 28, wherein the outer peripheral sidewalls of the cathode frictionally engage the coating.

* * * * *